US010091553B1

(12) United States Patent
Bertz et al.

(10) Patent No.: US 10,091,553 B1
(45) Date of Patent: Oct. 2, 2018

(54) VIDEO CONTENT DISTRIBUTION SYSTEM AND METHOD

(71) Applicant: Sprint Communications Company L.P., Overland Park, KS (US)

(72) Inventors: Lyle T. Bertz, Lee's Summit, MO (US); James W. Norris, Kansas City, MO (US); Daniel J. Sershen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 79 days.

(21) Appl. No.: 14/152,648

(22) Filed: Jan. 10, 2014

(51) Int. Cl.
| | |
|---|---|
| *H04N 21/2343* | (2011.01) |
| *G06F 21/62* | (2013.01) |
| *G06F 15/16* | (2006.01) |
| *H04W 28/08* | (2009.01) |
| *H04W 88/06* | (2009.01) |
| *H04N 21/462* | (2011.01) |
| *H04N 21/433* | (2011.01) |

(52) U.S. Cl.
CPC ..... *H04N 21/4621* (2013.01); *H04N 21/2343* (2013.01); *H04N 21/4331* (2013.01)

(58) Field of Classification Search
None
See application file for complete search history.

(56) References Cited

U.S. PATENT DOCUMENTS

| | | | | |
|---|---|---|---|---|
| 6,621,865 | B1* | 9/2003 | Yu | H04N 19/33 375/240.1 |
| 9,326,012 | B1* | 4/2016 | Dorwin | G06F 21/6209 |
| 9,516,354 | B1* | 12/2016 | Verheem | H04N 21/2187 |
| 2003/0041257 | A1* | 2/2003 | Wee | H04N 7/167 713/193 |
| 2004/0101204 | A1* | 5/2004 | King | G06T 9/20 382/243 |
| 2005/0182855 | A1* | 8/2005 | Apostolopoulos | H04N 21/2343 709/247 |

(Continued)

OTHER PUBLICATIONS

Tim Siglin, What is 2K and 4K video?, Mar. 8 2013, Streaming Video.*

(Continued)

*Primary Examiner* — Nasser M Goodarzi
*Assistant Examiner* — Terrika Peterson

(57) ABSTRACT

A video content distribution method is provided that comprises transmitting, by a video content distribution server, an initial portion of a scalable video file associated with a video to a mobile communication device via a first communication channel, transmitting an additional portion of the scalable video file to the mobile communication device via a second communication channel, and reconstructing, by the mobile communication device, at least some of the scalable video file based on reconstruction data using the initial portion and the additional portion of the scalable video file. The method also comprises playing, by the mobile communication device, at least a portion of the video at an initial resolution and frame rate based on the initial portion of the scalable video file and at least a portion of the video at an improved resolution and frame rate based on the reconstructed at least some of the scalable video file.

20 Claims, 7 Drawing Sheets

(56) References Cited

U.S. PATENT DOCUMENTS

| | | | |
|---|---|---|---|
| 2006/0127059 A1* | 6/2006 | Fanning | H04N 21/23439 386/248 |
| 2011/0191446 A1* | 8/2011 | Dazzi | G06F 15/16 709/219 |
| 2011/0306386 A1* | 12/2011 | Centoza | H04W 28/08 455/552.1 |
| 2012/0076204 A1* | 3/2012 | Raveendran | H04N 21/23432 375/240.12 |
| 2012/0163427 A1* | 6/2012 | Kim | H04N 21/23432 375/219 |
| 2012/0174174 A1* | 7/2012 | Ozawa | H04N 7/173 725/110 |
| 2012/0328001 A1* | 12/2012 | He | H04N 11/02 375/240.03 |
| 2013/0222515 A1* | 8/2013 | Abuan | H04N 7/14 348/14.01 |
| 2014/0002753 A1* | 1/2014 | Griffin | H04W 88/06 348/734 |
| 2014/0204745 A1* | 7/2014 | Nuss | H04W 28/08 370/232 |
| 2014/0269553 A1* | 9/2014 | Stein | H04M 1/72527 370/329 |
| 2015/0103886 A1* | 4/2015 | He | H04N 19/30 375/240.02 |
| 2015/0350290 A1* | 12/2015 | Yang | H04L 65/80 348/14.02 |

OTHER PUBLICATIONS

Whirlpool.net.au Home Theater FAQ—HD and SD resolutions_ Oct. 6, 2010.*

* cited by examiner

VIDEO CONTENT DISTRIBUTION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many mobile communication devices today comprise media players, which are capable of playing streamed media content, such as videos, at various spatial and temporal resolutions.

SUMMARY

In an embodiment, a video content distribution method is disclosed. The video content distribution method comprises transmitting, by a video content distribution server, an initial portion of a scalable video file associated with a video to a mobile communication device via a first communication channel. The initial portion of the scalable video is associated with an initial resolution and frame rate and the initial portion of the scalable video file comprises data to enable playing of the video at the initial resolution and frame rate. The video content distribution method also comprises playing, by the mobile communication device, at least a portion of the video at the initial resolution and frame rate based on the initial portion of the scalable video file and transmitting, by the video content distribution server, reconstruction data associated with the scalable video file to the mobile communication device. The video content distribution method additionally comprises transmitting an additional portion of the scalable video file to the mobile communication device via a second communication channel. The additional portion of the scalable video file is associated with an improved resolution and frame rate and the additional portion of the scalable video file comprises data to enable playing of the video at the improved resolution and frame rate. The video content distribution method further comprises reconstructing, by the mobile communication device, at least some of the scalable video file based on the reconstruction data using the initial portion of the scalable video file and the additional portion of the scalable video file and playing, by the mobile communication device, at least a portion of the video at the improved resolution and frame rate based on the reconstructed at least some of the scalable video file.

In an embodiment, a video content distribution system is disclosed. The video content distribution system comprises a video content distribution server comprising a memory and a processor. The video content distribution server is configured to transmit an initial portion of a scalable video file associated with a video to a mobile communication device via a first communication channel. The initial portion of the scalable video is associated with an initial resolution and frame rate and the initial portion of the scalable video file comprises data to enable playing of the video at the initial resolution and frame rate. The mobile communication device is configured to play at least a portion of the video at the initial resolution and frame rate based on the initial portion of the scalable video file. The video content distribution server is also configured to transmit reconstruction data associated with the scalable video file to the mobile communication device and transmit an additional portion of the scalable video file to the mobile communication device via a second communication channel. The additional portion of the scalable video file is associated with an improved resolution and frame rate and the additional portion of the scalable video file comprises data to enable playing of the video at the improved resolution and frame rate. The mobile communication device is configured to reconstruct at least some of the scalable video file based on the reconstruction data using the initial portion of the scalable video file and the additional portion of the scalable video file and play at least a portion of the video at the improved resolution and frame rate based on the reconstructed at least some of the scalable video file.

In an embodiment, a video content distribution method is disclosed. The video content distribution method comprises receiving, by a mobile communication device that comprises a media player, an initial portion of a scalable video file associated with a video via a first communication channel in response to a request from the mobile communication device to stream the video. The initial portion of the scalable video is associated with an initial resolution and frame rate and the initial portion of the scalable video file comprises data to enable playing of the video at the initial resolution and frame rate. The video content distribution method also comprises building, by the mobile communication device, at least a portion of the video at the initial resolution and frame rate based on the initial portion of the scalable video file, placing, by the mobile communication device, the at least the portion of the video at the initial resolution and frame rate into a buffer of a media player on the mobile communication device, playing, by the media player, some of the at least a portion of the video at the initial resolution and frame rate, receiving, by the mobile communication device, reconstruction data associated with the scalable video file, and receiving, by the mobile communication device, an additional portion of the scalable video file via a second communication channel. The additional portion of the scalable video file is associated with an improved resolution and frame rate and the additional portion of the scalable video file comprises data to enable playing of the video at the improved resolution and frame rate. The video content distribution method further comprises reconstructing, by the mobile communication device, at least some of the scalable video file based on the reconstruction data using the initial portion of the scalable video file and the additional portion of the scalable video file, building, by the mobile communication device, at least a portion of the video at the improved resolution and frame rate based on the reconstructed at least some of the scalable video file, placing, by the mobile communication device, the at least the portion of the video at the improved resolution and frame rate into the buffer of the media player, and playing, by the media player, some of the at least a portion of the video at the improved resolution and frame rate.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
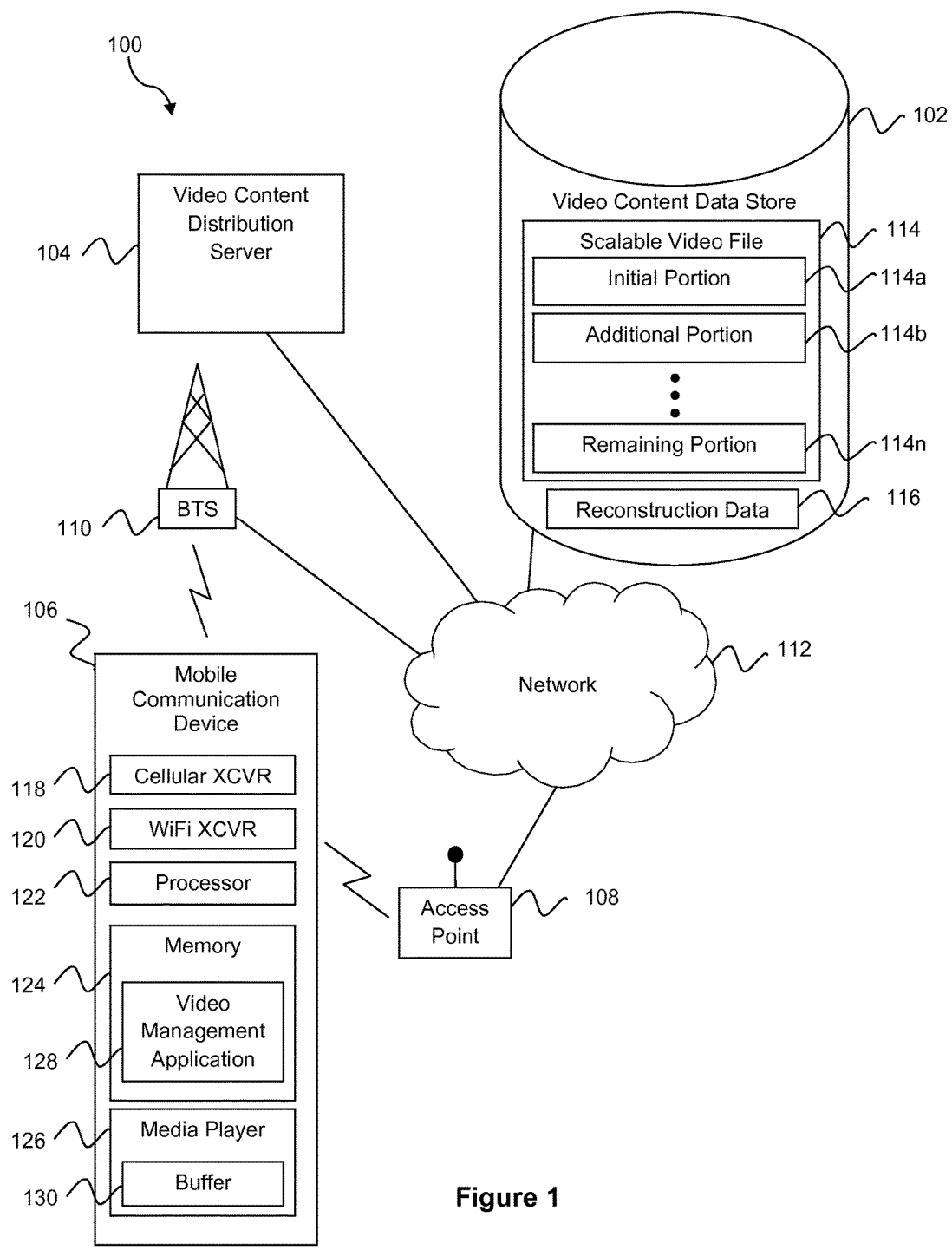
- FIG. 1 is a block diagram of a video content delivery system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to a more cost efficient video content distribution system and method. Specifically, the pending application discloses a scalable video file associated with a video that comprises a plurality of portions (e.g., an initial portion, an additional portion, and a remaining portion). Each of the portions may be associated with different spatial and temporal resolutions and may comprise data to enable playing the video at the respective spatial and temporal resolutions. For instance, the initial portion of the scalable video file may be associated with an initial resolution and frame rate (e.g., standard definition and 15 frames per second) and comprise all the necessary data to enable playing the video at the initial resolution and frame rate while the additional portion may be associated with an improved resolution and frame rate (e.g., 1080p high definition and 30 frames per second) and comprise some of the data to enable playing the video at the improved resolution and frame rate. Varying both resolution and frame rate with each portion as disclosed herein is in contrast to existing video content distribution technologies, which merely enable varying one at a time (i.e., resolution or frame rate).

In response to a user request, the initial portion of the scalable video file may be transmitted to a mobile communication device via a first communication channel that is established using a cellular wireless communication protocol such as a long-term evolution (LTE) wireless communication protocol. In some embodiments, the initial portion of the scalable video file may be transmitted in an encrypted form. At least a portion of the video may be played by the mobile communication device at the initial resolution and frame rate based on the initial portion of the scalable video file. At a later time or simultaneously with the transmission of the initial portion of the scalable video file, the additional portion of the scalable video file may be transmitted to the mobile communication device via a second communication channel that is established using a short range wireless communication protocol such as a WiFi wireless communication protocol. Additionally, reconstruction data may be transmitted to the mobile communication device to enable the mobile communication device to reconstruct at least some of the scalable video file using the initial and additional portions of the scalable video file. At least a portion of the video may be played by the mobile communication device at the improved resolution and frame rate based on the reconstructed at least some of the scalable video file.

Transmitting the potentially encrypted initial portion of the scalable video file via a first communication channel that is established using a cellular wireless communication protocol such as a long-term evolution (LTE) wireless communication protocol provides an end user with a quality video (albeit at a lower resolution and frame rate) that is playable as is without additional data (e.g., the reconstruction data) in a guaranteed, reliable, safer, and faster way, which increases customer satisfaction while saving the wireless communication service provider money. Since the video is unable to be played at the improved resolutions and frame rates without the initial portion, which is potentially encrypted and sent via a more secure channel, the additional portions of the scalable video file that enable the video to be played at improved resolutions and frame rates can be transmitted via less secure channels. Thus, the wireless communication service provider may save money because the initial portion of the scalable video file merely comprises the minimum amount of data to enable playing of the video at the initial resolution and frame rate and the additional portion of the scalable video file can be transmitted in less expensive and/or less secure ways (e.g., via WiFi).

Additionally, the pending video content distribution system and method are more cost efficient for the wireless communication service provider because a user of the mobile communication device does not have to pull down a whole new copy of the requested video in order to watch the video at improved resolutions and frame rates. For example, a user may stream the video associated with the scalable video file while on a trip. Upon the initial user request while on the trip, the mobile communication device may receive the initial portion of the scalable video file via a first communication channel that is established using a cellular wireless communication protocol such as a long-term evolution (LTE) wireless communication protocol and play at least a portion of the video at the initial resolution and frame rate based on the initial portion of the scalable video file. Whenever the user gets home or arrives at a location that offers a second communication channel that is established using a short range communication protocol such as a WiFi communication protocol, the mobile communication device merely has to receive the additional portion of the scalable video file via the second communication channel and the reconstruction data in order to view the video at improved resolutions and frame rates instead of having to stream a whole new copy of the video.

Turning now to FIG. 1, a video content distribution system 100 is described. In an embodiment, the video content distribution system 100 comprises a video content data store 102, a video content distribution server 104, a mobile communication device 106, a wireless access point 108, a cellular base transceiver station 110, and a network 112. It is understood that the video content distribution system 100 may comprise any number of the components 102, 104, 106, 108, 110, and/or 112.

The video content data store 102 may comprise one or more scalable video files such as the scalable video file 114. In an embodiment, the scalable video file 114 is associated with a video. The scalable video file 114 may comprise a plurality of portions. For example, the scalable video file 114 may comprise an initial portion 114a, an additional portion 114b, and/or a remaining portion 114n. While the scalable video file 114 is illustrated as comprising three portions, the scalable video file 114 may comprise more or less portions without departing from the scope of the present disclosure.

In an embodiment, the initial portion 114a of the scalable video file 114 is associated with an initial resolution and frame rate and comprises data to enable playing of the video at the initial resolution and frame rate, the additional portion 114b of the scalable video file 114 is associated with an improved resolution and frame rate and comprises data to enable playing of the video at the improved resolution and frame rate, and the remaining portion 114n of the scalable video file 114 is associated with a further improved resolution and frame rate and comprises data to enable playing of the video at the further improved resolution and frame rate. Thus, in an embodiment, each of the portions 114a, 114b, and 114n of the scalable video file 114 is associated with a different resolution and frame rate. For example, the initial portion 114a of the scalable video file 114 may be associated with standard definition and 15 frames per second while the additional portion 114b of the scalable video file 114 may be associated with 720p high definition and 27 frames per second and the remaining portion 114n of the scalable video file 114 may be associated with 2k ultra high definition and 60 frames per second. In an embodiment, the initial portion 114a of the scalable video file 114 comprises the minimum amount of data necessary to enable playing of the video at the initial resolution and frame rate. The video may be unable to be played at the improved resolution and frame rate or at the further improved resolution and frame rate without the initial portion 114a.

In terms of resolution, each of the portions 114a, 114b, and 114n of the scalable video file 114 may be associated with one of standard definition, 720p high definition, 1080p high definition, 2k ultra high definition, 4k ultra high definition, 8k ultra high definition, or another spatial resolution. With respect to frame rate, each of the portions 114a, 114b, and 114n of the scalable video file 114 may be associated with one of 15 frames per second, 27 frames per second, 30 frames per second, 60 frames per second, 256 frames per second, or another temporal resolution.

In addition to being associated with a resolution and frame rate, one or more of the portions 114a, 114b, or 114n of the scalable video file 114 may be associated with two or three dimensions. For example, the initial portion 114a of the scalable video file 114 may be associated with two dimensions and may comprise data to enable playing of the video as a two dimensional video. In another example, the additional portion 114b and/or the remaining portion 114n of the scalable video file 114 may be associated with three dimensions and may comprise data to enable playing of the video as a three dimensional video.

The video content data store 102 may also comprise reconstruction data 116. The reconstruction data 116 may indicate that there are other portions 114b and/or 114n of the scalable video file 114 available. The reconstruction data 116 may also enable at least some of the scalable video file 114 to be reconstructed by the mobile communication device 106. For example, the reconstruction data 116 may be used by the mobile communication device 106 to reconstruct at least some of the scalable video file 114 so that the video can be played at the improved resolution and frame rate associated with the additional portion 114b of the scalable video file 114 and/or the further improved resolution and frame rate associated with the remaining portion 114n of the scalable video file 114. In an embodiment, the initial portion 114a of the scalable video file 114 is playable as is without additional data such as the reconstruction data 116. In contrast, at least some of the scalable video file 114 may need to be reconstructed based on the reconstruction data 116 using the initial portion 114a, the additional portion 114b, and/or the remaining portion 114n of the scalable video file 114 to enable playing of the video at improved resolutions and frame rates. While illustrated as being separate from the scalable video file 114, the reconstruction data 116 may be a part of the scalable video file 114. For example, in an embodiment, the reconstruction data 116 is part of the initial portion 114a of the scalable video file 114.

The video content distribution server 104 may be implemented as a computer system, which is described in more detail hereinafter. In an embodiment, the video content distribution server 104 transmits one or more of the initial portion 114a of the scalable video file 114, the additional portion 114b of the scalable video file 114, or the remaining portion 114n of the scalable video file 114 to the mobile communication device 106. In some embodiments, the video content distribution server 104 may transmit the initial portion 114a of the scalable video file 114 to the mobile communication device 106 and one or more other servers may transmit the additional portion 114b and/or the remaining portion 114n of the scalable video file 114 to the mobile communication device 106.

The video content distribution server 104 may transmit one or more of the portions 114a, 114b, or 114n of the scalable video file 114 in response to one or more user requests to stream the video from the mobile device 106 and/or as network conditions permit (e.g., when there is less network traffic and/or more bandwidth). In an embodiment, the portions 114a, 114b, and 114n of scalable video file 114 are transmitted at different times. For example, the video content distribution server 104 may transmit the initial portion 114a of the scalable video file 114 to the mobile communication device 106 in response to a user request to stream the video and then at a later time the additional portion 114b of the scalable video file 114 may be transmitted to the mobile communication device 106 when network conditions permit and/or in response to an additional user request. In alternative embodiments, the video content distribution server 104 may transmit the portions 114a, 114b, and/or 114n of the scalable video file 114 simultaneously.

The video content distribution server 104 may transmit the initial portion 114a of the scalable video file 114 via a first communication channel and the additional portion 114b and remaining portion 114n of the scalable video file 114 via one or more other communication channels. For example, the video content distribution server 104 may transmit the initial portion 114a of the scalable video file 114 via a first communication channel that is established using a long-term evolution (LTE) wireless communication protocol while the additional portion 114b of the scalable video file 114 may be transmitted via a second communication protocol that is established using a WiFi wireless communication protocol. Other communication channels, such as communication channels established using a code division multiple access (CDMA) wireless communication protocol, a global system for mobile communications (GSM) wireless communication protocol, a worldwide interoperability for microwave access (WiMAX) wireless communication protocol, a Bluetooth® wireless communication protocol, or another cellular or short range wireless communication protocol, could be used to transmit any of the portions 114a, 114b, 114n of the scalable video file 114 without departing from the scope of the present disclosure.

In an embodiment, in addition to the video content distribution server 104 transmitting the initial portion 114a of the scalable video file 114 via a first communication channel that is established using a cellular wireless communication protocol such as a long-term evolution (LTE) wireless communication protocol, the initial portion 114a of the scalable video file 114 is transmitted in an encrypted form. Transmitting the potentially encrypted initial portion 114a of the scalable video file 114 via a first communication channel that is established using a cellular wireless communication protocol such as a long-term evolution (LTE) wireless communication protocol provides an end user with a quality video (albeit at a lower resolution and frame rate) that is playable as is without additional data (e.g., the reconstruction data 116) in a guaranteed, reliable, safer, and faster way, which increases customer satisfaction while saving the wireless communication service provider money. Since the video is unable to be played at the improved resolutions and frame rates without the initial portion 114a, which is potentially encrypted and sent via a more secure channel, the additional portion(s) (e.g., the additional portion 114b and/or the remaining portion 114n) of the scalable video file 114 that enable the video to be played at improved resolutions and frame rates can be transmitted via less secure channels. Therefore, the wireless communication service provider may save money because the initial portion 114a of the scalable video file 114 merely comprises the minimum amount of data to enable playing of the video at the initial resolution and frame rate and the additional portion 114b and/or the remaining portion 114n of the scalable video file 114 can be transmitted in less expensive and/or less secure ways (e.g., via WiFi).

While illustrated in FIG. 1 as a single video content data store 102 and single video content distribution server 104, the video content distribution system 100 may comprise multiple servers and data stores. For example, the initial portion 114a of the scalable video file 114 may be stored in the video content data store 102 and transmitted by the video content distribution server 104 while the additional portion 114b and/or the remaining portion 114n of the scalable video file 114 may be stored in another data store and transmitted by another server, such as a third-party server.

The mobile communication device 106 may be a mobile phone, a personal digital assistant (PDA), or a media player. In an embodiment, the mobile communication device 106 may be implemented as a handset. Handsets are described in more detail hereinafter. The mobile communication device 106 may be provisioned to receive wireless communication service by a wireless communication service provider, for example to receive voice and/or data communication service via a wireless link to a radio access network (RAN) operated or leased by the wireless communication service provider. The mobile communication device 106 may comprise a cellular radio transceiver 118, a short range radio transceiver 120, a processor 122, a memory 124, and a media player 126. In an embodiment, the short range radio transceiver 120 is a WiFi radio transceiver.

The cellular radio transceiver 118 is configured to establish a radio communication link with the base transceiver station 110 based on one or more of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol. The base transceiver station 110 provides connectivity to the network 112 to the mobile communication device 106. The network 112 comprises one or more private networks, one or more public networks, or a combination thereof. The network 112 promotes communication as desired among the several components 102, 104, 106, 108, and/or 110.

The short range radio transceiver 120 is configured to establish a radio communication link with the wireless access point 108 based on a WiFi wireless communication protocol, a Bluetooth® wireless communication protocol, or based on another short range wireless communication protocol.

A video management application 128 may be stored in the memory 124 of the mobile communication device 106. In an embodiment, the video management application 128 receives the portions 114a, 114b, and 114n of the scalable video file 114 from the video content distribution server 104 simultaneously or at different times. The video management application 128 may also receive the reconstruction data 116 from the video content distribution server 104. In an embodiment, the video management application 128 builds at least a portion of the video associated with the scalable video file 114 at the initial resolution and frame rate based on the initial portion 114a of the scalable video file 114 and places the at least the portion of the video at the initial resolution and frame rate into a buffer 130 of a media player 126 on the mobile communication device 106.

The video management application 128 may also reconstruct some of the scalable video file 114 based on the reconstruction data 116 using the initial portion 114a of the scalable video file 114 and the additional portion 114b of the scalable video file 114. In an embodiment, the video management application 128 builds at least a portion of the video associated with the scalable video file 114 at the improved resolution and frame rate based on the reconstructed at least some of the scalable video file 114 and places the at least the portion of the video at the improved resolution and frame rate into the buffer 130 of the media player 126 on the mobile communication device 106. The video management application 128 may further assemble the at least the portion of the video at the improved resolution and frame rate into the buffer 130 of the media player 126 in an appropriate sequence.

In some embodiments, the video management application 128 reconstructs the entirety of the scalable video file 114 based on the reconstruction data 116 using the initial portion 114a of the scalable video file 114, the additional portion 114b of the scalable video file 114, and the remaining portion 114n of the scalable video file 114. In such embodiments, the video management application 128 builds at least a portion of the video associated with the scalable video file 114 at the further improved resolution and frame rate based on the reconstructed scalable video file 114 and places the at least the portion of the video at the further improved resolution and frame rate into the buffer 130 of the media player 126 on the mobile communication device 106. The video management application 128 may further assemble the at least the portion of the video at the further improved resolution and frame rate into the buffer 130 of the media player 126 at an appropriate sequence.

The mobile communication device 106 may comprise the media player 126. In an embodiment, the media player 126 is a component that plays media content, such as the video associated with the scalable video file 114. For example, the media player 126 may play the video associated with the scalable video file 114 at the initial resolution and frame rate, the improved resolution and frame rate, and the further improved resolution and frame rate. The media player 126 may comprise the buffer 130 to temporarily store portions of the video associated with the scalable video file 114 prior to the media player 126 playing the video at the initial resolution and frame rate, the improved resolution and frame rate, or the further improved resolution and frame rate. In some embodiments, the media player 126 itself may perform the actions of the video management application 128.

The mobile communication device 106 receiving the scalable video file 114 in portions (e.g., the first, additional, and remaining portions 114a, 114b, and 114n) along with the reconstruction data 116 allows a user of the mobile communication device 106 to not have to pull down a whole new copy of the requested video in order to watch the video at improved resolutions and frame rates at a later time, thereby reducing costs for the wireless communication service provider. For example, a user may stream the video associated with the scalable video file 114 while on a trip. Upon the initial user request while on the trip, the mobile communication device 106 may receive the initial portion 114a of the scalable video file 114 via a first communication channel that is established using a cellular wireless communication protocol such as a long-term evolution (LTE) wireless communication protocol and play at least a portion of the video at the initial resolution and frame rate based on the initial portion 114a of the scalable video file 114.

Whenever the user gets home or arrives at a location that offers a second communication channel that is established using a short range communication protocol such as a WiFi communication protocol, the mobile communication device 106 merely has to receive the additional portion 114b of the scalable video file 114 via the second communication channel and the reconstruction data 116 in order to view the video at improved resolutions and frame rates instead of having to stream a whole new copy of the video. To enable viewing the video associated with the scalable video file 114 at the improved resolution and frame rate, the mobile communication device 106 reconstructs at least some of the scalable video file 114 based on the reconstruction data 116 using the initial portion 114a and the additional portion 114b of the scalable video file 114, builds at least a portion of the video associated with the scalable video file 114 at the improved resolution and frame rate based on the reconstructed at least some of the scalable video file 114, and plays some of the video at the improved resolution and frame rate.

Figure 2:
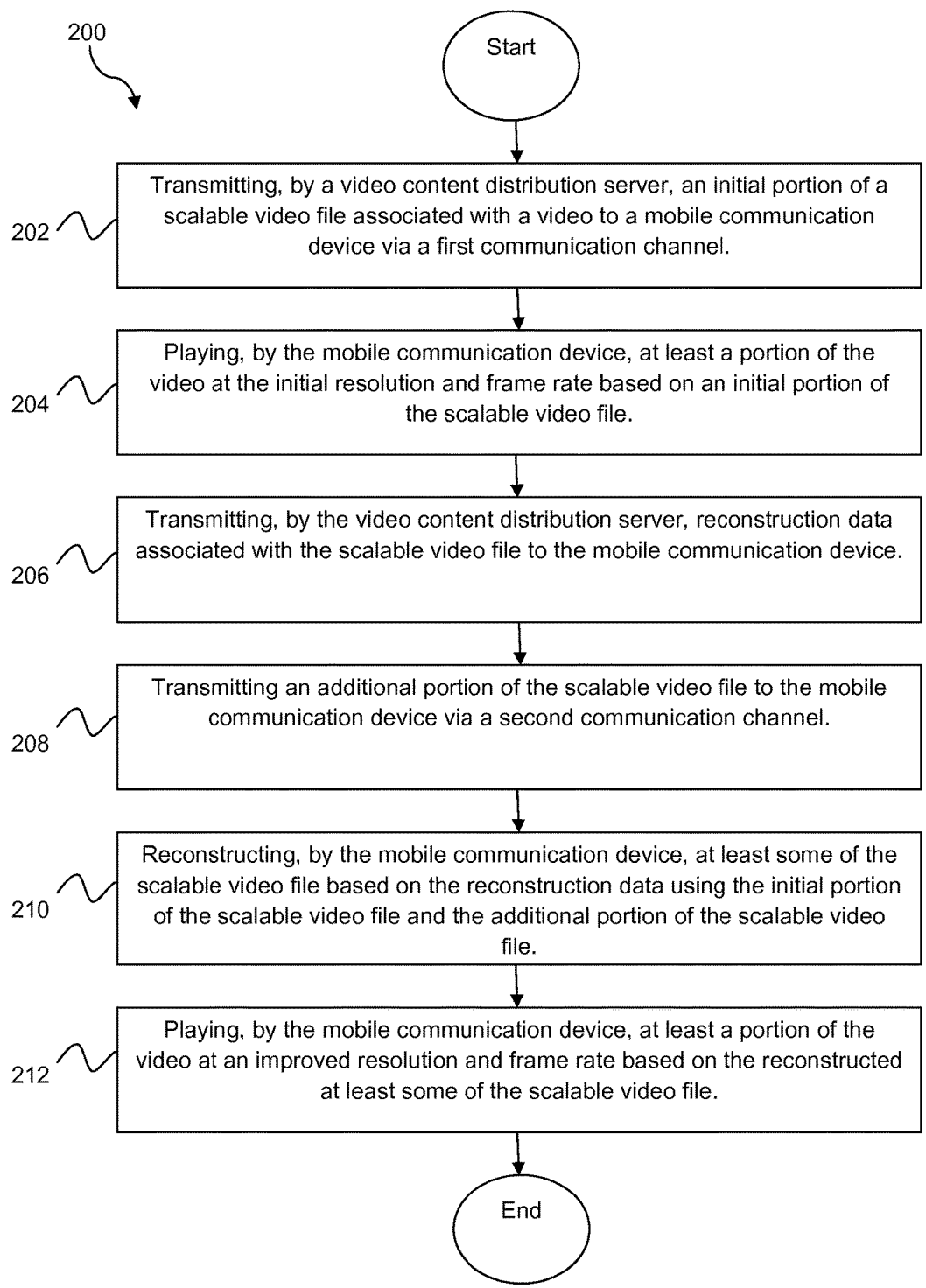
FIG. 2 is a flow chart of a video content distribution method according to an embodiment of the disclosure.

Turning now to FIG. 2, a video content distribution method 200 is described. At block 202, the initial portion 114a of the scalable video file 114 associated with the video is transmitted by the video content distribution server 104 to the mobile communication device 106 via a first communication channel. The initial portion 114a of the scalable video file 114 may be associated with an initial resolution and frame rate and comprise data to enable playing of the video at the initial resolution and frame rate. In an embodiment, the first communication channel is established by a long-term evolution (LTE) wireless communication protocol. Alternatively, the first communication channel may be established by another cellular wireless communication protocol. In some embodiments, the initial portion 114a of the scalable video file 114 is transmitted in an encrypted form.

At block 204, at least a portion of the video associated with the scalable video file 114 is played by the mobile communication device 106 at the initial resolution and frame rate based on the initial portion 114a of the scalable video file 114. At block 206, the reconstruction data 116 associated with the scalable video file 114 is transmitted by the video content distribution server 104 to the mobile communication device 106. Although illustrated in FIG. 2 as occurring after the transmission of the initial portion 114a of the scalable video file 114, in an embodiment, the initial portion 114a of the scalable video file 114 and the reconstruction data 116 are transmitted simultaneously.

At block 208, the additional portion 114b of the scalable video file 114 associated with the video is transmitted to the mobile communication device 106 via a second communication channel. The additional portion 114b of the scalable video file 114 may be associated with an improved resolution and frame rate and comprise data to enable playing of the video at the improved resolution and frame rate. In an embodiment, the second communication channel is established by a WiFi wireless communication protocol. Alternatively, the second communication channel may be established by another short range wireless communication protocol. Although illustrated in FIG. 2 as occurring after the transmission of the initial portion 114a of the scalable video file 114, in an embodiment, the initial portion 114a and the additional portion 114b of the scalable video file 114 are transmitted simultaneously.

At block 210, at least some of the scalable video file 114 is reconstructed by the mobile communication device 106 based on the reconstruction data 116 using the initial portion 114a and the additional portion 114b of the scalable video file 114. At block 212, at least a portion of the video associated with the scalable video file 114 is played by the mobile communication device 106 at the improved resolution and frame rate based on the reconstructed at least some of the scalable video file 114.

Figure 3:
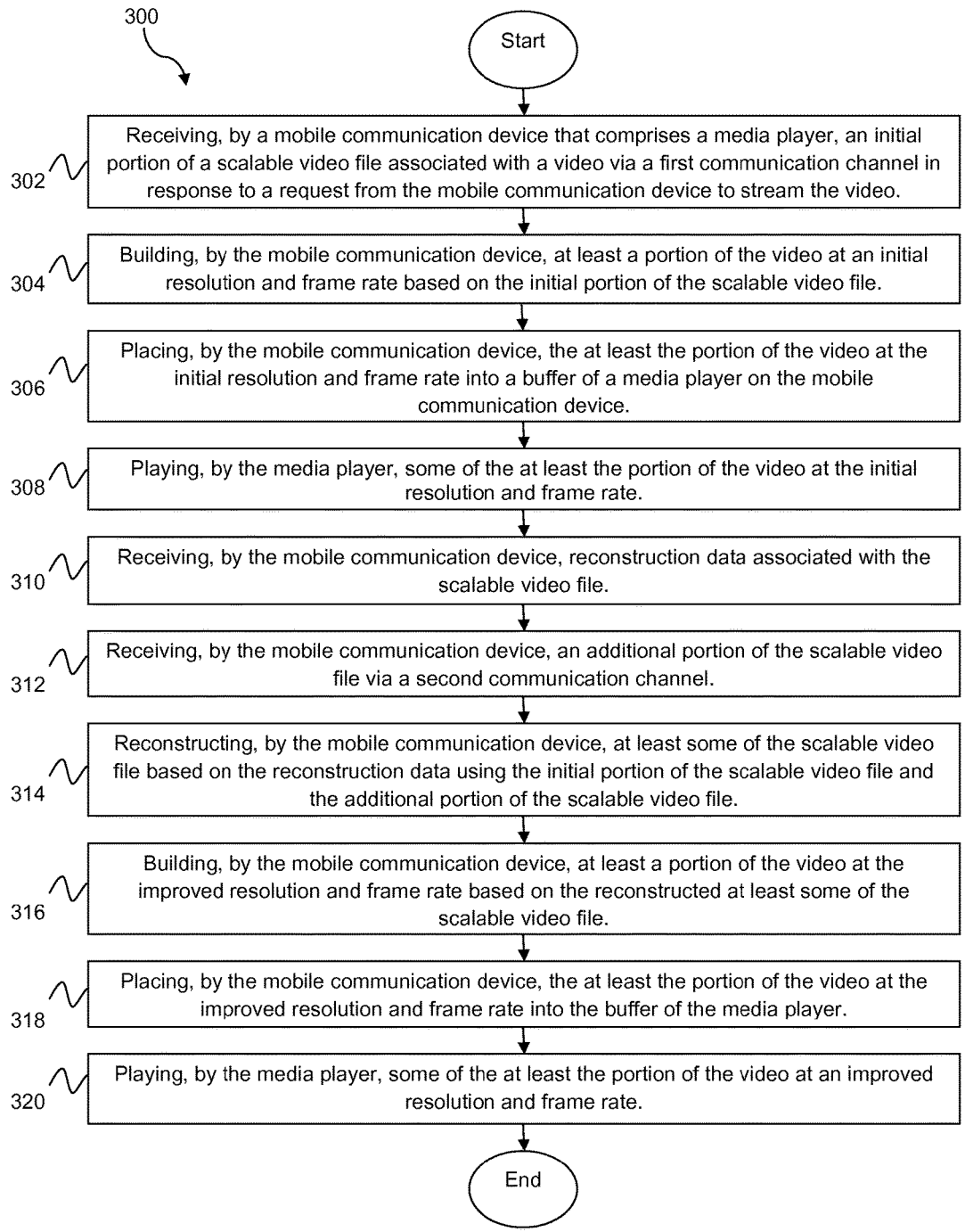
FIG. 3 is a flow chart of another video content distribution method according to an embodiment of the disclosure.

Turning now to FIG. 3, a video content distribution method 300 is described. At block 302, the initial portion 114a of the scalable video file 114 associated with the video is received by the mobile communication device 106 via a first communication channel in response to a request from the mobile communication device 106 to stream the video. The initial portion 114a of the scalable video file 114 may be associated with an initial resolution and frame rate and comprise data to enable playing of the video at the initial resolution and frame rate. In an embodiment, the first communication channel is established by a long-term evolution (LTE) wireless communication protocol. Alternatively, the first communication channel may be established by another cellular wireless communication protocol. In some embodiments, the initial portion 114a of the scalable video file 114 is transmitted in an encrypted form.

At block 304, at least a portion of the video is built by the mobile communication device 106 at the initial resolution and frame rate based on the initial portion 114a of the scalable video file 114. At block 306, the at least the portion of the video at the initial resolution and frame rate is placed by the mobile communication device 106 into the buffer 130 of the media player 126 of the mobile communication device 106. At block 308, some of the at least the portion of the video is played at the initial resolution and frame rate by the media player 126.

At block 310, the reconstruction data 116 associated with the scalable video file 114 is received by the mobile communication device 106. Although illustrated in FIG. 2 as occurring after the transmission of the initial portion 114a of the scalable video file 114, in an embodiment, the initial portion 114a of the scalable video file 114 and the reconstruction data 116 are transmitted simultaneously.

At block 312, the additional portion 114b of the scalable video file 114 associated with the video is received by the mobile communication device 106 via a second communication channel. The additional portion 114b of the scalable video file 114 may be associated with an improved resolution and frame rate and comprise data to enable playing of the video at the improved resolution and frame rate. In an embodiment, the second communication channel is established by a WiFi wireless communication protocol. Alternatively, the second communication channel may be established by another short range wireless communication protocol. Although illustrated in FIG. 2 as occurring after the receipt of the initial portion 114a of the scalable video file 114, in an embodiment, the initial portion 114a and the additional portion 114b of the scalable video file 114 are received simultaneously.

At block 314, at least some of the scalable video file 114 is reconstructed by the mobile communication device 106 based on the reconstruction data 116 using the initial portion 114a and the additional portion 114b of the scalable video file 114. At block 316, at least a portion of the video is built by the mobile communication device 106 at the improved resolution and frame rate based on the reconstructed at least some of the scalable video file 114.

At block 318, the at least the portion of the video at the improved resolution and frame rate is placed by the mobile communication device 106 into the buffer 130 of the media player 126 of the mobile communication device 106. At block 320, some of the at least the portion of the video is played at the improved resolution and frame rate by the media player 126.

Figure 4:
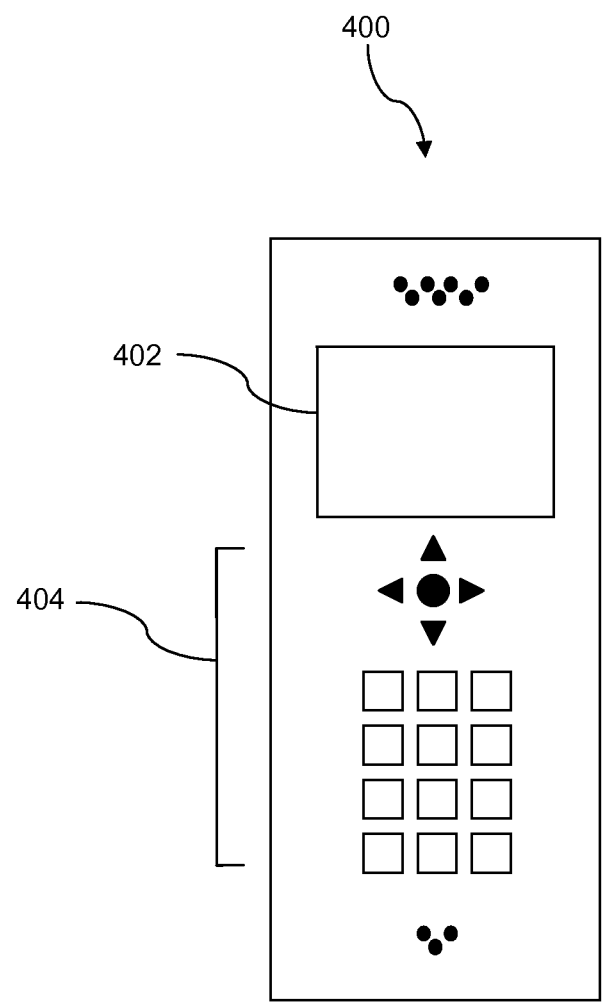
FIG. 4 depicts a mobile device which may be operable for implementing aspects of the present disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
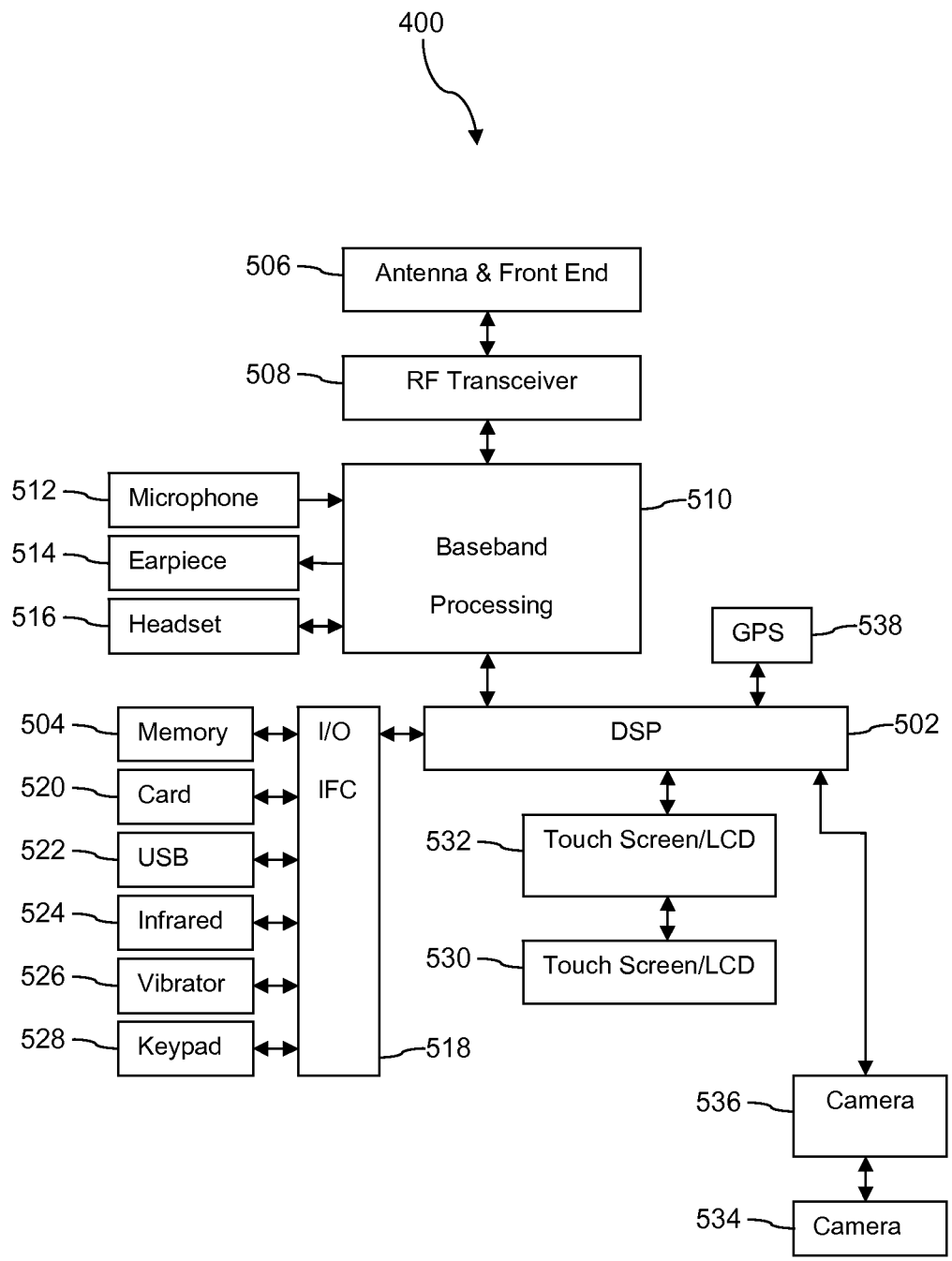
FIG. 5 shows a block diagram of a mobile device which may be operable for implementing aspects of the present disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
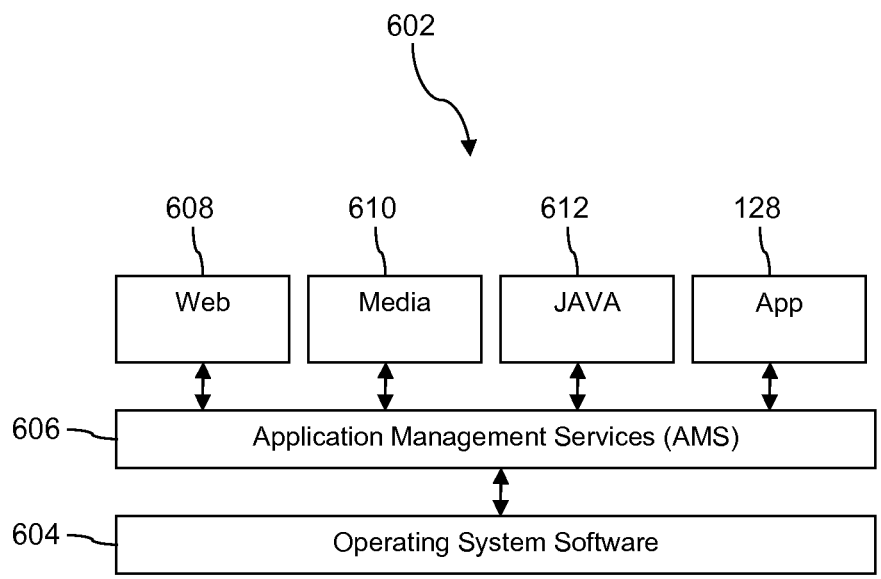
FIG. 6A illustrates a software environment that may be capable of implementing embodiments of the present disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and a video management application 128. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audio-visual media. The JAVA applets 612 may be executed by the mobile device 400 to provide a variety of functionality including games, utilities, and other functionality. The video management application 128 is described further above.

Figure 6B:
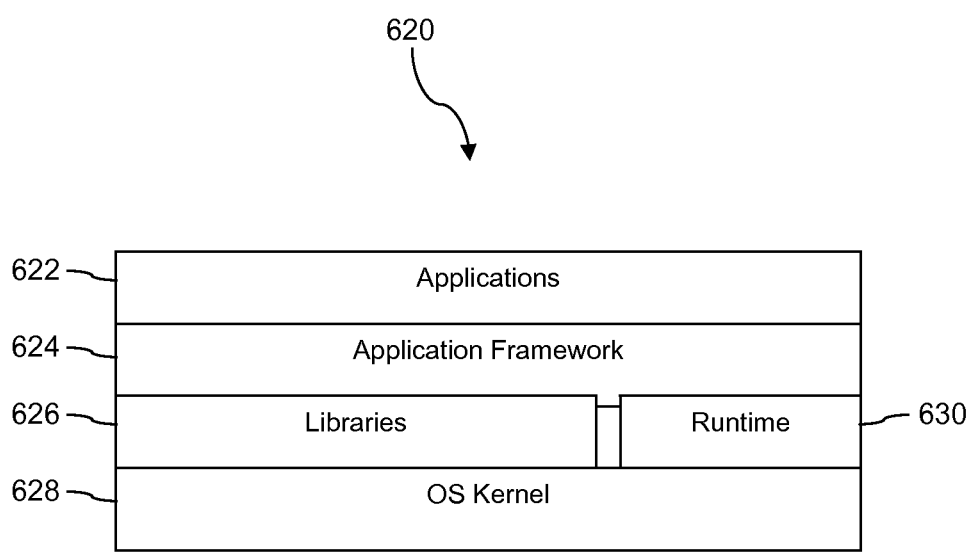
FIG. 6B illustrates an alternative software environment that may be capable of implementing embodiments of the present disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
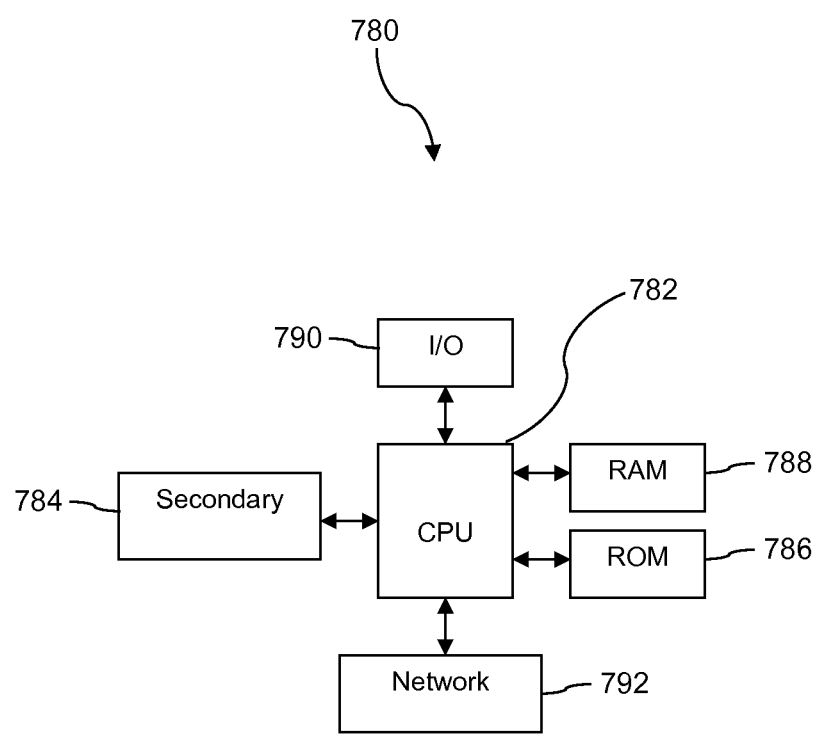
FIG. 7 illustrates an exemplary computer system that may be suitable for implementing the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A video content distribution method, comprising:
   transmitting, by a video content distribution server, an initial stream of a scalable video file associated with a video to a mobile communication device via a communication channel established using a cellular wireless communication protocol, wherein the initial stream of the scalable video file is associated with an initial resolution and initial frame rate, and wherein the initial stream of the scalable video file comprises data to enable playing of the video at the initial resolution and the initial frame rate;
   playing, by the mobile communication device, at least a portion of the video at the initial resolution and the initial frame rate based on the initial stream of the scalable video file;
   transmitting, by the video content distribution server, reconstruction data associated with the scalable video file to the mobile communication device, wherein the reconstruction data is data that is not a component of the scalable video file and indicates that other portions of the scalable video file are available and enables the mobile communication device to reconstruct the initial stream of the scalable video file and an additive stream of the scalable video file to form at least some of the scalable video file;
   when the mobile communication device has established connectivity with a WiFi channel subsequent to the transmission of the initial stream of the scalable video file via the communication channel established using the cellular wireless communication protocol, transmitting, to the mobile communication device via the WiFi channel, the additive stream of the scalable video file that is associated with at least one of a second resolution and a second frame rate, wherein the additive stream is transmitted in a less secure manner than the initial stream, wherein the second resolution is a higher resolution relative to the initial resolution of the initial stream and the second frame rate is a higher frame rate relative to the initial frame rate of the initial stream, wherein the additive stream of the scalable video file comprises data to present the scalable video file at one or more of the second resolution and the second frame rate, wherein the additive stream of the scalable video file is unable to be played without the initial stream of the scalable video file, and wherein the initial stream and the additive stream are not playable together as the scalable video file at the one or more of the second resolution and the second frame rate after transmission of the initial stream and the additive stream without the reconstruction data;

reconstructing, by the mobile communication device, the entirety of the scalable video file based on the reconstruction data using the initial stream of the scalable video file and the additive stream of the scalable video file to enable playing the video at the at least one of the second resolution and the second frame rate; and playing, by the mobile communication device via reliance on the initial stream and the additive stream of the scalable video file, at least a portion of the video at the at least one of the second resolution and the second frame rate based on the reconstructed at least some of the scalable video file, wherein the video is unable to be played at the at least one of the second resolution and the second frame rate without the initial stream and the additive stream of the scalable video file.

2. The video content distribution method of claim 1, wherein the cellular wireless protocol comprises a long-term evolution wireless communication protocol.

3. The video content distribution method of claim 1, wherein the transmitting the initial stream of the scalable video file to the mobile communication device and the transmitting the additive stream of the scalable video file to the mobile communication device occur concurrently or the transmitting the additive stream of the scalable video file to the mobile communication device occurs after the transmitting at least some of the initial stream of the scalable video file to the mobile communication device.

4. The video content distribution method of claim 1, wherein the reconstruction data is a part of the initial stream of the scalable video file.

5. The video content distribution method of claim 1, wherein the initial stream of the scalable video file is transmitted by the video content distribution server in an encrypted form.

6. The video content distribution method of claim 1, wherein the transmitting the additive stream of the scalable video file to the mobile communication device is performed by one of the video content distribution server or a different server.

7. The video content distribution method of claim 1, further comprising:

transmitting a remaining stream of the scalable video file to the mobile communication device via a third communication channel, wherein the remaining stream of the scalable video file is associated with at least one of a third resolution and a third frame rate, wherein the third resolution is a higher resolution relative to the second resolution of the additive stream and the third frame rate is a higher frame rate relative to the second frame rate of the additive stream, and wherein the remaining stream of the scalable video file comprises data to present the video at the at least one of the third resolution and the third frame rate;

reconstructing, by the mobile communication device, the entirety of scalable video file based on the reconstruction data using the initial stream of the scalable video file, the additive stream of the scalable video file, and the remaining stream of scalable video file; and playing, by the mobile communication device via reliance on the initial stream, at least a portion of the video at the at least one of the third resolution and the third frame rate based on the reconstructed scalable video file.

8. The video content distribution method of claim 1, wherein the initial resolution comprises a standard definition that is less than 720 high definition and the initial frame rate includes a frame rate of at least 15 frames per second.

9. The video content distribution method of claim 8,
wherein the second resolution comprises at least one of 720 high definition, 1080 high definition, 2k ultra high definition, 4k ultra high definition, or 8k ultra high definition, and wherein the second frame rate comprises at least one of at least 27 frames per second, at least 30 frames per second, at least 60 frames per second, or at least 256 frames per second.

10. The video content distribution method of claim 1, wherein the initial stream of the scalable video is also associated with two dimensions, and wherein the initial stream of the scalable video file comprises data to initially present the video as a two dimensional video.

11. The video content distribution method of claim 10, wherein the additive stream of the scalable video is also associated with three dimensions, and wherein the additive stream of the scalable video file comprises data to present the video as a three dimensional video.

12. The video content distribution method of claim 1, wherein the additive stream is transmitted after the initial stream is transmitted and in response to the mobile communication device arriving at a location that offers the WiFi channel.

13. A video content distribution system, comprising:

a video content distribution server comprising a memory and a processor, wherein the video content distribution server is configured to:

transmit an initial stream of a scalable video file associated with a video to a mobile communication device via a communication channel established using a cellular wireless communication protocol, wherein the initial stream of the scalable video file is associated with an initial resolution and an initial frame rate, and wherein the initial stream of the scalable video file comprises data to enable playing of the video at the initial resolution and the initial frame rate, transmit reconstruction data associated with the scalable video file to the mobile communication device, wherein the reconstruction data is data that is not a component of the scalable video file and indicates that other portions of the scalable video file are available and enables the mobile communication device to reconstruct the initial stream of the scalable video file and an additive stream of the scalable video file to form at least some of the scalable video file, and when the mobile communication device has established connectivity with a short range communication channel subsequent to the transmission of the initial stream of the scalable video file via the communication channel established using the cellular wireless communication protocol, transmit, to the mobile communication device via the short range communication channel, the additive stream of the scalable video file that is associated with at least one of a second resolution and a second frame rate, wherein the additive stream is transmitted in a less secure manner than the initial stream, wherein the second resolution is a higher resolution relative to the initial resolution of the initial stream and the second frame rate is a higher frame rate relative to the initial frame rate of the initial stream, wherein the additive stream of the scalable video file comprises data to present the video at the at least one of the second resolution and the second frame rate, and wherein the additive stream of the scalable video file is unable to be played without the initial stream of the scalable video file; and a mobile communication device comprising a video management application stored in a memory of the mobile communication device that, when executed by a processor of the mobile communication device:

reconstructs the entirety of the scalable video file based on the reconstruction data after receiving the initial stream of the scalable video file and the additive stream of the scalable video file to enable playing the video at the at least one of the second resolution and the second frame rate, and plays, via reliance on the initial stream and the additive stream of the scalable video file, at least a portion of the video at the at least one of the second resolution and the second frame rate based on the reconstructed at least some of the scalable video file, wherein the video is unable to be played at the at least one of the second resolution and the second frame rate without the initial stream and the additive stream of the scalable video file, and wherein the initial stream and the additive stream are not playable together as the scalable video file at the one or more of the second resolution and the second frame rate after transmission of the initial stream and the additive stream without the reconstruction data.

14. The video content distribution system of claim 13, wherein the mobile communication device comprises a media player, wherein the media player comprises a buffer, and wherein the media player is configured to play from the buffer at least a portion of the video at the initial resolution and the initial frame rate based on the initial stream of the scalable video file and at least a portion of the video at the at least one of the second resolution and the second frame rate based on the reconstruction data, the initial stream of the scalable video file, and the additive stream of the scalable video file.

15. The video content distribution system of claim 14, wherein the video management application further assembles the at least the portion of the video at the at least one of the second resolution and the second frame rate into the buffer of the media player in an appropriate sequence.

16. The video content distribution system of claim 13, wherein the short range communication channel is a WiFi channel.

17. A video content distribution method, comprising:

receiving, by a mobile communication device that comprises a media player via a communication channel established using a cellular wireless communication protocol, an initial stream of a scalable video file associated with a video in response to a request from the mobile communication device to stream the video, wherein the initial stream of the scalable video file is associated with an initial resolution and an initial frame rate, and wherein the initial stream of the scalable video file comprises data to enable playing of the video at the initial resolution and the initial frame rate;

building, by the mobile communication device, at least a portion of the video at the initial resolution and the initial frame rate based on the initial stream of the scalable video file;

placing, by the mobile communication device, the at least the portion of the video at the initial resolution and the initial frame rate into a buffer of a media player on the mobile communication device;

playing, by the media player, some of the at least the portion of the video at the initial resolution and the initial frame rate;

receiving, by the mobile communication device, reconstruction data associated with the scalable video file, wherein the reconstruction data is data that is not a component of the scalable video file and indicates that other portions of the scalable video file are available and enables the mobile communication device to reconstruct the initial stream of the scalable video file and an additive stream of the scalable video file to form at least some of the scalable video file;

after establishing connectivity to a short range channel subsequent to receiving the initial stream of the scalable video file via the communication channel established using the cellular wireless communication protocol, receiving, by the mobile communication device via the short range channel, the additive stream of the scalable video file that is associated with at least one of a second resolution and a second frame rate, wherein the additive stream is transmitted in a less secure manner than the initial stream, wherein the second resolution is a higher resolution relative to the initial resolution of the initial stream and the second frame rate is a higher frame rate relative to the initial frame rate of the initial stream, wherein the additive stream of the scalable video file comprises data to present the video at the at least one of the second resolution and the second frame rate, wherein the additive stream of the scalable video file is unable to be played without the initial stream of the scalable video file, and wherein the initial stream and the additive stream are not playable together as the scalable video file at the one or more of the second resolution and the second frame rate after receipt of the initial stream and the additive stream without the reconstruction data;

reconstructing, by the mobile communication device, the entirety of the scalable video file based on the reconstruction data using the initial stream of the scalable video file and the additive stream of the scalable video file;

building, by the mobile communication device, at least a portion of the video at the at least one of the second resolution and the second frame rate based on the reconstructed at least some of the scalable video file via reliance on the initial stream of the scalable video file and the additive stream of the scalable video file to enable playing the video at the at least one of the second resolution and the second frame rate;

placing, by the mobile communication device, the at least the portion of the video at the at least one of the second resolution and the second frame rate into the buffer of the media player; and playing, by the media player via reliance on the initial stream and the additive stream of the scalable video file, at least some of the at least the portion of the video at the at least one of the second resolution and the second frame rate, wherein the video is unable to be played at the at least one of the second resolution and the second frame rate without the initial stream and the additive stream of the scalable video file.

18. The video content distribution method of claim 17, wherein each of the receiving the initial stream of the scalable video file, the building the at least the portion of the video at the initial resolution and the initial frame rate, the placing the at least the portion of the video at the initial resolution and the initial frame rate into the buffer, the receiving the reconstruction data, the receiving the additive stream of the scalable video file, the reconstructing the entirety of the scalable video file, the building the at least the portion of the video at the at least one of the second resolution and the second frame rate, and the placing the at least the portion of the video at the at least one of the second resolution and the second frame rate into the buffer is performed by one of a media player or a video management application stored in a memory of the mobile communication device and executed by a processor of the mobile communication device.

19. The video content distribution method of claim 18, wherein the receiving the initial stream of the scalable video file and the receiving the additive stream of the scalable video file occur concurrently or the receiving the additive stream of the scalable video file occurs after the receiving at least some of the initial stream of the scalable video file.

20. The video content distribution method of claim 18, wherein the receiving the additive stream of the scalable video file is in response to a user request.

* * * * *